(12) United States Patent
Lach et al.

(10) Patent No.: US 9,150,243 B2
(45) Date of Patent: Oct. 6, 2015

(54) HARMONIC PINION TORQUE CORRECTION

(75) Inventors: David R. Lach, Novi, MI (US); William H. Wittig, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 658 days.

(21) Appl. No.: 13/216,429

(22) Filed: Aug. 24, 2011

(65) Prior Publication Data

US 2012/0130592 A1 May 24, 2012

Related U.S. Application Data

(60) Provisional application No. 61/416,548, filed on Nov. 23, 2010.

(51) Int. Cl.
  *B62D 5/22* (2006.01)
  *B62D 5/20* (2006.01)
  *B62D 5/04* (2006.01)

(52) U.S. Cl.
  CPC ............ *B62D 5/0463* (2013.01); *B62D 5/0466* (2013.01); *B62D 5/0472* (2013.01)

(58) Field of Classification Search
  USPC ................. 701/41–42, 33.4, 43; 180/446, 180/443–444, 447; 318/799; 702/116
  See application file for complete search history.

(56) References Cited

U.S. PATENT DOCUMENTS

| | | | | |
|---|---|---|---|---|
| 5,181,173 A * | 1/1993 | Avitan | | 701/42 |
| 5,668,721 A * | 9/1997 | Chandy | | 180/446 |
| 6,039,144 A * | 3/2000 | Chandy et al. | | 180/446 |
| 6,152,254 A * | 11/2000 | Phillips | | 180/422 |
| 6,186,267 B1 * | 2/2001 | Hackl et al. | | 180/444 |
| 6,273,211 B1 * | 8/2001 | Engels et al. | | 180/446 |
| 6,370,459 B1 * | 4/2002 | Phillips | | 701/41 |
| 6,763,851 B1 * | 7/2004 | Breitweg et al. | | 137/625.21 |
| 6,968,920 B2 * | 11/2005 | Barton et al. | | 180/446 |
| 7,040,992 B2 * | 5/2006 | Dine et al. | | 464/170 |
| 7,905,317 B2 * | 3/2011 | Kruttschnitt et al. | | 180/444 |
| 8,354,810 B2 * | 1/2013 | Horii et al. | | 318/400.23 |
| 8,452,493 B2 * | 5/2013 | Katch et al. | | 701/41 |
| 8,589,030 B2 * | 11/2013 | Lindenstruth | | 701/42 |
| 8,768,641 B2 * | 7/2014 | Lindenstruth | | 702/113 |
| 2003/0028302 A1 * | 2/2003 | Sebastian et al. | | 701/41 |

(Continued)

FOREIGN PATENT DOCUMENTS

| | | | |
|---|---|---|---|
| EP | 1764284 A2 * | 3/2007 | |
| JP | 2003205846 | 7/2003 | |

OTHER PUBLICATIONS

An error driven hybrid neuro-fuzzy torque/speed controller for electrical vehicle induction motor drive; El-Saady, G. ; Sharaf, A.M. ; Makky, A.M. ; El-Sherbiny, M.K. ; Mohamed, G.; Intelligent Vehicles '94 Symposium, Proceedings of the Digital Object Identifier: 10.1109/IVS.1994.639560; Publication Year: 1994 , pp. 449-454.*

(Continued)

*Primary Examiner* — Cuong H Nguyen

(74) *Attorney, Agent, or Firm* — Cantor Colburn LLP

(57) ABSTRACT

A method of controlling an electric power steering system is provided. The method includes: determining a scale factor based on a handwheel position; applying the scale factor to a hand wheel torque value to scale the hand wheel torque value; and generating a corrected handwheel torque signal based on the scaled hand wheel torque value.

6 Claims, 3 Drawing Sheets

(56) References Cited

U.S. PATENT DOCUMENTS

| | | | |
|---|---|---|---|
| 2003/0042067 A1* | 3/2003 | Yanaka | 180/446 |
| 2003/0084733 A1* | 5/2003 | Nicholson | 73/862.324 |
| 2006/0217206 A1* | 9/2006 | Thompson | 464/112 |
| 2006/0276297 A1* | 12/2006 | Ziech | 475/221 |
| 2007/0062755 A1* | 3/2007 | Krieger et al. | 180/446 |
| 2007/0235240 A1* | 10/2007 | Lauer et al. | 180/204 |
| 2008/0027609 A1* | 1/2008 | Aoki et al. | 701/43 |
| 2009/0234539 A1* | 9/2009 | Champagne et al. | 701/41 |
| 2010/0211263 A1* | 8/2010 | Lindenstruth | 701/41 |
| 2010/0286869 A1* | 11/2010 | Katch et al. | 701/41 |
| 2011/0000738 A1* | 1/2011 | Horii et al. | 180/446 |
| 2011/0125450 A1* | 5/2011 | Lindenstruth | 702/113 |

OTHER PUBLICATIONS

Dynamic control allocation for reusable launch vehicles; Hodel, A.S. ; Callahan, R.; System Theory, 2002. Proceedings of the Thirty-Fourth Southeastern Symposium on; Digital Object Identifier: 10.1109/SSST.2002.1027012; Publication Year: 2002 , pp. 92-96.*

Direct Yaw-moment Control Adapted to Driver Behavior Recognition; Mizushima, T. ; Raksincharoensak, P. ; Nagai, M. SICE-ICASE, 2006. International Joint Conference; Digital Object Identifier: 10.1109/SICE.2006.315542 Publication Year: 2006 , pp. 534-539.*

Power Factor Correction of Direct Torque Controlled Brushless DC Motor Drive; Ozturk, S.B. ; Oh Yang ; Toliyat, H.A. Industry Applications Conference, 2007. 42nd IAS Annual Meeting. Conference Record of the 2007 IEEE Digital Object Identifier: 10.1109/07IAS.2007.52; Publication Year: 2007 , pp. 297-304.*

Nonlinear control of associations including synchronous motors and AC/DC/AC converters: A formal analysis of speed regulation and power factor correction; El Magri, A. ; Giri, F. ; Aboulifa, A.; Lachkar, I. ; Chaoui, F.Z.; American Control Conference, 2009. ACC '09. Digital Object Id: 10.1109/ACC.2009.5160580; Pub. Yr: 2009, pp. 3470-3475.*

Driver-Vehicle-Road Closed-Loop System Modeling Method for Steering Efforts Test; Zuo Jianling ; Yu Zhuoping ; Zhang Yuancai ; Chen Hui; Vehicular Electronics and Safety, 2006. ICVES 2006. IEEE International Conference on; Digital Object Identifier: 10.1109/ICVES.2006.371588; Publication Year: 2006 , pp. 228-231.*

PMSM Servo Drive System for Electric Power Steering Based on Two-Degree-of-Freedom Torque Control; Hui Chen ; Canlong Jin ; Ping Jiang ; Xiaoping Gong ; Xiangzhi Feng; Industrial Technology, 2006. ICIT 2006. IEEE International Conference on Digital Object Identifier: 10.1109/ICIT.2006.372598; Publication Year: 2006 , pp. 2901-2906.*

To a question about ways of forming a signal for producing additional torque of electric power steering system; Bochenkov, B. ; Tyurin, M. ; Krinichnyi, V.; Strategic Technology, The 1st International Forum on; Digital Object Identifier: 10.1109/IFOST.2006.312305; Publication Year: 2006 , pp. 272-273.*

An opto-electronic 18 b/revolution absolute angle and torque sensor for automotive steering applications; Mortara, A. et al.; Solid-State Circuits Conf., 2000. Digest of Technical Papers. ISSCC. 2000 IEEE Inter.; Digital Object Id: 10.1109/ISSCC.2000.839740,Publication Year: 2000 , pp. 182-183.*

Flexible PID Control Design in Assistance Condition of Automotive EPS System; Yin Chunfang ; Wang Shaohua ; Zhao Jinbo Computer Science—Technology and Applications, 2009. IFCSTA '09. International Forum on; vol. 2; DOI: 10.1109/IFCSTA.2009.175; Publication Year: 2009 , pp. 222-225.*

Design considerations of sinusoidally excited permanent magnet machines for low torque ripple applications; Islam, M.S. ; Mir, S. ; Sebastian, T. ; Underwood, S.;Industry Applications Conference, 2004. 39th IAS Annual Meeting. Conference Record of the 2004 IEEE; vol. 3; DOI: 10.1109/IAS.2004.1348703; Publication Year: 2004 , pp. 1723-173.*

Torque Wrench Description and Operation, 4 pages from "The poorman's off chassis restoration.com" http://www.tpocr.com/torqwrench.html, printed hardcopy on Jul. 25, 2014.*

Road-Departure Prevention in an Emergency Obstacle Avoidance Situation; Katzourakis, D.I. ; de Winter, J.C.F. ; Alirezaei, M. ; Corno, M. ; Happee, R.; Systems, Man, and Cybernetics: Systems, IEEE Transactions on; vol. 44 , Issue: 5 DOI: 10.1109/TSMC.2013.2263129; Publication Year: 2014 , pp. 621-629.*

Driver-Vehicle-Road Closed-Loop System Modeling Method for Steering Efforts Test; Zuo Jianling ; Yu Zhuoping ; Zhang Yuancai ; Chen Hui; Vehicular Electronics and Safety, 2006. ICVES 2006. IEEE International Conference on; DOI: 10.1109/ICVES.2006.371588; Publication Year: 2006 , pp. 228-231.*

Torque estimation in electrical power steering systems; Chabaan, R.C; Vehicle Power and Propulsion Conference, 2009. VPPC '09. IEEE; DOI: 10.1109/VPPC.2009.5289769; Publication Year: 2009 , pp. 790-797; Papers (1) | Patents (2).*

Vehicle yaw dynamics control by torque-based assist systems enforcing driver's steering feel constraints; Zafeiropoulos, S. ; Di Cairano, S.; American Control Conference (ACC), 2013; DOI: 10.1109/ACC.2013.6580899; Publication Year: 2013 , pp. 6746-6751.*

Extended European Search Report of Application No. EP 1109232.7, Harmonic Pinion Torque Correction, Filing Date Nov. 22, 2011, Mailing date Jul. 11, 2012, 6 pages.

* cited by examiner

HARMONIC PINION TORQUE CORRECTION

CROSS-REFERENCES TO RELATED APPLICATIONS

This patent application claims priority to U.S. Provisional Patent Application Ser. No. 61/416,548 filed Nov. 23, 2010 which is incorporated herein by reference in its entirety.

BACKGROUND OF THE INVENTION

The subject invention relates to methods and systems for controlling harmonic pinion torque correction in steering systems.

Steering systems often have unwanted variations in the amount of steering torque that must be applied by a driver. One source is the phasing of the upper and lower cardan joints on an intermediate shaft. Cardan joints phasing imperfections will cause a cyclical variation in the steering torque applied by a driver that repeats every 180 degrees of the steering wheel. A goal in the design of any steering system is to eliminate, or at least minimize, unwanted steering torque variations that are felt by a driver. The best approach to eliminate these torque variations is to eliminate or minimize them at the source, however, due to various limitations and trade-offs, torque variations will always be present to some degree.

Accordingly, it is desirable to provide systems and methods for correcting torque variations.

SUMMARY OF THE INVENTION

In one exemplary embodiment, a method of controlling an electric power steering system is provided. The method includes: determining a scale factor based on a handwheel position; applying the scale factor to a hand wheel torque value to scale the hand wheel torque value; and generating a corrected handwheel torque signal based on the scaled hand wheel torque value.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
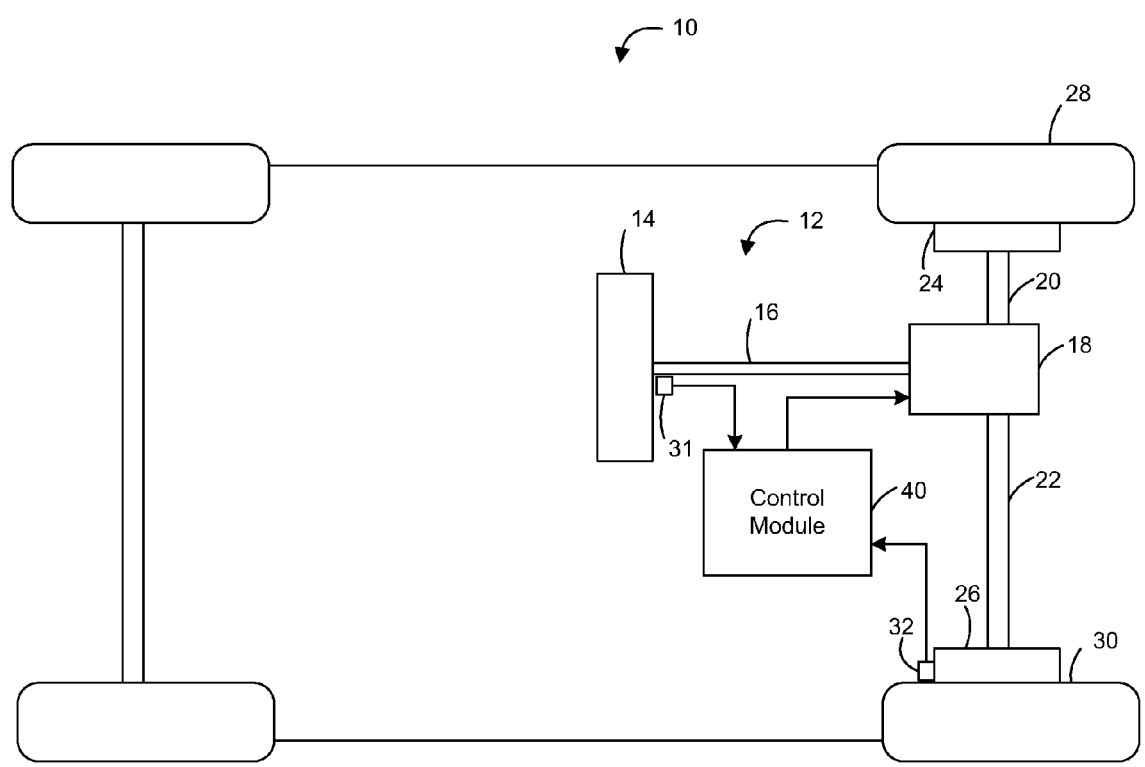
FIG. 1 is a functional block diagram of a steering system that includes a torque correction system in accordance with exemplary embodiments.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle 10 including a steering system 12 is illustrated. In various embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively, of the vehicle 10. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors 31, 32 that detect and measure observable conditions of the steering system 12 and/or of the vehicle 10. The sensors 31, 32 generate sensor signals based on the observable conditions. In various embodiments, the sensors 31, 32 can include, for example, a load sensor, a driver torque sensor, and/or a position sensor.

In various embodiments, a control module 40 controls the operation of the steering system 12 and/or the vehicle 10 based on one or more of the sensor signals and further based on the torque correction systems and methods of the present disclosure. Generally speaking, the torque correction systems and methods of the present disclosure reduce steering torque variation felt by a driver due to intermediate shaft phasing. For example, the systems and methods receive a handwheel angle signal from a position sensor which measures the handwheel angle and uses this information to modify the torque sensor signal and remove any harmonic variation in the output signal. Once implemented, the systems and methods allow a designer more flexibility in designing steering system geometry because the variation in handwheel torque due to the positioning of the steering system components may be removed analytically.

Figure 2:
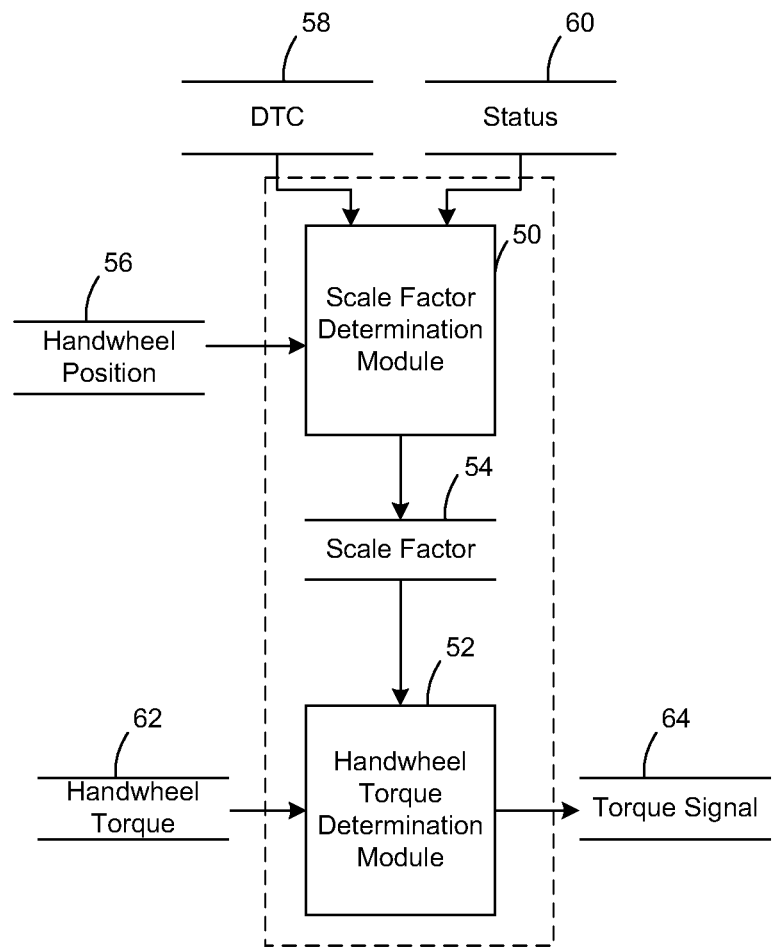
FIG. 2 is a dataflow diagram illustrating a torque correction system in accordance with exemplary embodiments.

Referring now to FIG. 2 where a dataflow diagram illustrates exemplary embodiments of the control module 40 of FIG. 1 used to control the steering system 12 and/or the vehicle 10 of FIG. 1. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly reduce steering torque variation. As can be appreciated, the sub-modules shown in FIG. 2 can be implemented as a single control module 40 (as shown) or multiple control modules (not shown). Inputs to the control module 40 can be generated from the sensors of the vehicle 10 (FIG. 1), can be modeled within the control module 40 (e.g., by other sub-modules (not shown)), can be received from other control modules (not shown), and/or can be predefined. In various embodiments, the control module 40 includes a scale factor determination module 50 and a handwheel torque determination module 52.

The scale factor determination module 50 receives as input a relative handwheel position. Based on the relative handwheel position, the scale factor determination module 50 determines a scale factor. In various embodiments, the scale factor determination module 50 determines the scale factor (TorqCorrSclFctr) based on the following equation:

$$\text{TorqCorrSclFctr}=1+\text{TorqCorrMag}*\text{Cos}(2*\text{HwPos-Rel}+\text{TorqCorrPhase}). \quad (1)$$

Where TorqCorrMag represents a torque correction magnitude. The TorqCorrPhase represents the torque correction phase. The correction magnitude and phase are based on analysis of cardan joint angles and geometry. In various embodiments, a wrapping function may be applied to the handwheel position to accommodate the range of degrees accepted by the cosine function.

In various embodiments, the scale factor determination module 50 performs a validity check before computing the scale factor. For example, the scale factor determination module 50 may evaluate one or more diagnostic trouble codes relating to the handwheel position. When a diagnostic trouble code has been set to TRUE, then the scale factor may be set to a predetermined value (e.g., one, or any other value). Otherwise, when the diagnostic trouble code(s) are set to FALSE, then the scale factor is determined as discussed above.

In another example, the scale factor determination module 50 may evaluate the status of other algorithms that affect the handwheel position. For example, when the other algorithms have completed, the scale factor can be determined.

The handwheel torque determination module 52 receives as input a non-corrected handwheel torque and the correction factor. In various embodiments, the non-corrected handwheel torque can be estimated based on one or more algorithms. Based on the inputs, the handwheel torque determination module 52 generates a handwheel torque signal. For example, the handwheel torque determination module 52 determines a handwheel torque value based on the following equation:

$$\text{HwTrq}=\text{HwTrq}*\text{TorqCorrSclFctr}. \quad (2)$$

The handwheel torque determination module 52 then generates the handwheel torque signal based on the handwheel torque value.

Figure 3:
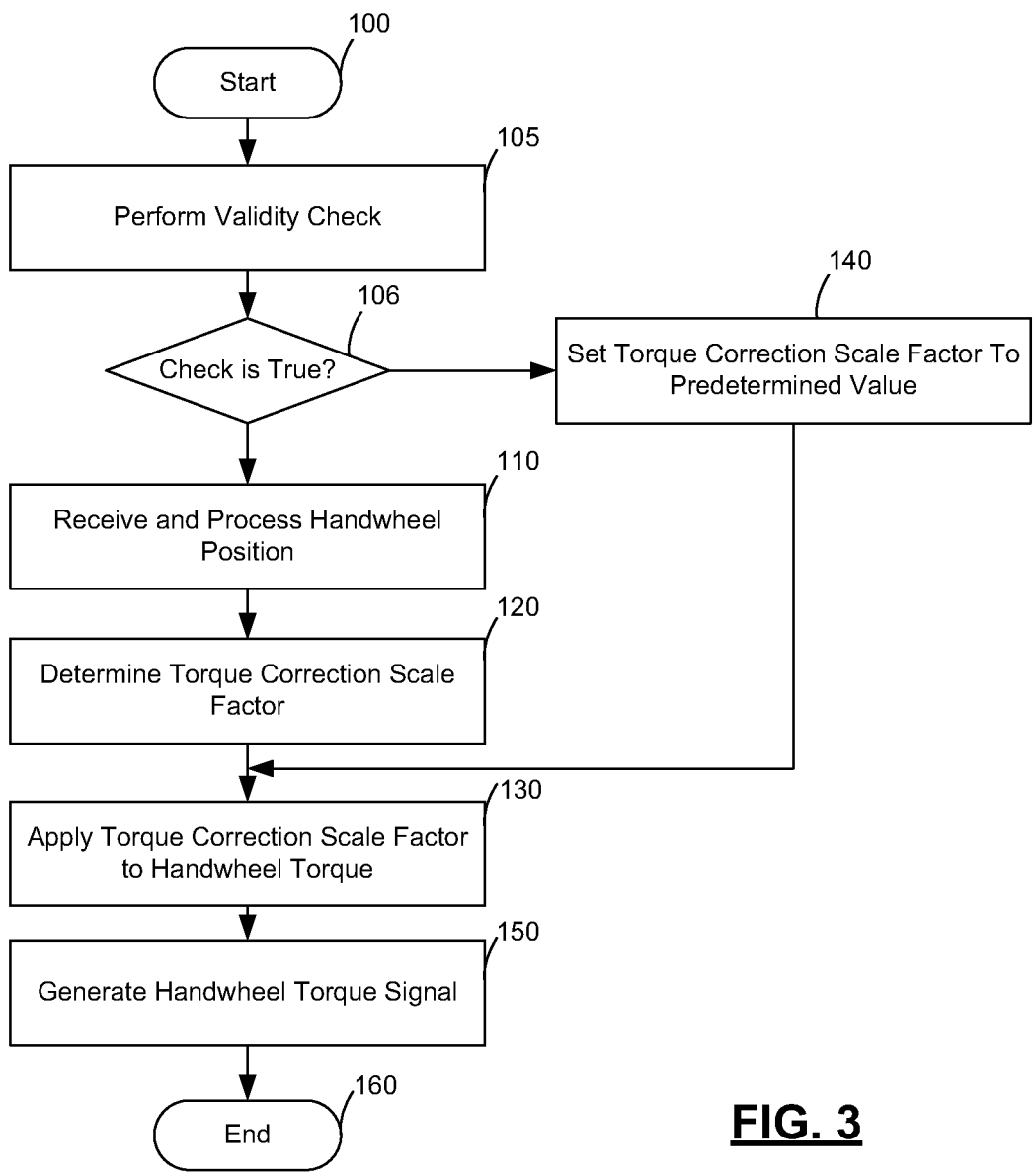
FIG. 3 is flow diagram illustrating a torque correction method in accordance with exemplary embodiments.

Referring now to FIG. 3 and with continued reference to FIG. 2, a flow diagram illustrates a steering control method that can be performed by the control module 40 of FIG. 1. As can be appreciated in light of the disclosure, the order of operation within the method is not limited to the sequential execution as illustrated in FIG. 3, but may be performed in one or more varying orders as applicable and in accordance with the present disclosure.

As can be appreciated, the steering control method can be scheduled to run based on predetermined events and/or can run at scheduled intervals during operation of the vehicle 10 (FIG. 1).

In one example, the method may begin at 100. A validity check is performed at 105. If the validity check is true at 106, then the relative handwheel position is received and processed at 110. For example, any necessary wrapping methods are performed on the handwheel position. The torque correction scale factor is determined, for example, using equation 1 at 120. The torque correction scale factor is applied to the handwheel torque, for example, using equation 2 at 130. The handwheel torque signal is generated at 150. Thereafter, the method may end at 160.

If, however, at 105, the validity check is false, the torque correction scale factor is set to a predetermined value at 140. The torque correction scale factor is applied to the handwheel torque, for example, using equation 2 at 130. The handwheel torque signal is generated at 150. Thereafter, the method may end at 160.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A control system for an electric power steering system, comprising:
    a scale factor determination module that determines a scale factor based on a handwheel position adjusted by a torque correction phase that is determined based on analysis of a cardan joint of the power steering system; and
    a harmonic pinion torque correction module that applies the scale factor to a hand wheel torque value to scale the hand wheel torque value, and that generates a corrected handwheel torque signal based on the scaled hand wheel torque value.

2. The control system of claim 1 wherein the scale factor determination module performs a validity check, determines the scale factor based on the handwheel position if the validity check is true, and sets the scale factor to a predetermined value if the validity check is false.

3. The control system of claim 2 further comprising a datastore that stores at least one diagnostic trouble code, wherein the scale factor determination module performs the validity check by evaluating the at least one diagnostic trouble code.

4. The control system of claim 1 wherein the scale factor determination module determines the scale factor further based on a torque correction magnitude.

5. The control system of claim 4 wherein the torque correction magnitude and the torque correction phase are based on analysis of cardan joint angles and geometry.

6. The control system of claim 1 further comprising a sub-module that models at least one of the handwheel position and the hand wheel torque value, wherein the scale factor determination module receives the at least one of the handwheel position the hand wheel torque value from the sub-module.

* * * * *